(12) United States Patent
Kikuchi

(10) Patent No.: US 6,353,582 B1
(45) Date of Patent: Mar. 5, 2002

(54) PICKUP DEVICE

(75) Inventor: Ikuya Kikuchi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/458,028

(22) Filed: Dec. 10, 1999

(30) Foreign Application Priority Data

Dec. 15, 1998 (JP) .......................................... 10-356392

(51) Int. Cl.$^7$ ................................................. G11B 7/09
(52) U.S. Cl. .................................. 369/44.23; 369/44.41
(58) Field of Search .......................... 369/44.23, 44.37, 369/44.41, 44.29, 44.35, 112.05, 112.07, 112.24

(56) References Cited

U.S. PATENT DOCUMENTS

| | | |
|---|---|---|
| 4,549,287 A | 10/1985 | Hatano et al. |
| 5,023,856 A | 6/1991 | Raaymakers et al. |
| 5,029,976 A | 7/1991 | Goto |
| 5,031,999 A | 7/1991 | Harada et al. |
| 5,327,270 A | 7/1994 | Miyatake |
| 5,349,175 A * | 9/1994 | Prikryl ..................... 369/44.41 |
| 5,442,615 A | 8/1995 | Ohsato et al. |
| 5,467,330 A | 11/1995 | Ishida |
| 5,515,348 A | 5/1996 | Ohsato |
| 5,699,340 A | 12/1997 | Lee et al. |
| 5,708,638 A * | 1/1998 | Braat et al. ............... 369/44.29 |
| 5,852,592 A * | 12/1998 | Braat ....................... 369/44.41 |
| 5,864,525 A * | 1/1999 | Takeshita et al. ........ 369/44.23 |

* cited by examiner

Primary Examiner—Thang Tran
(74) Attorney, Agent, or Firm—Morgan, Lewis & Bockius LLP

(57) ABSTRACT

A pickup device for writing or reading information onto or from an optical disk having a recording surface that is covered with a transmission substrate. The pickup device detects first reflected light corresponding to first illuminated light which is illuminated via a portion with a numerical aperture that is less than or equal to a second predetermined numerical aperture which is smaller than the first predetermined numerical aperture, of a reflected light from the recording surface, generates a first error signal which indicates a focus error of the first illuminated light on the recording surface, detects second reflected light corresponding to second illuminated light which is illuminated via a portion with a numerical aperture that is less than or equal to a predetermined numerical aperture which is greater than the second predetermined numerical aperture, of the reflected light, generates a second error signal which indicates a focus error of the second illuminated light on the recording surface and obtains a signal corresponding to spherical aberration by using at least one of the first or second error signal.

3 Claims, 9 Drawing Sheets

PICKUP DEVICE

BACKGROUND OF THE INVENTION

1. Field of the Invention

The present invention relates to a pickup device for writing or reading information on or from an optical disk.

2. Description of the Related Background Art

When a recording layer surface of an optical disk is directly exposed, the recording layer surface is flawed or is damaged due to collision with a pickup head at the time that information is written on or read from the optical disk. Since recording or playing process become disabled in the case, the optical disk has a transmission substrate of a predetermined thickness to write or read via the transmission substrate. Although the substrate for the purpose is formed, for example, by injection molding, it is difficult to make the substrate thickness equal to a determined value across the entire surface and normally, a thickness error of a few dozen μm occurs. In a conventional apparatus for reading or writing, the numerical aperture of an objective lens is determined not to occur any problem even when such a thickness error is included. However, due to demands for greater information amounts and higher recording densities, an increase in the numerical aperture of the objective lens is considered so as to enable recording with a reduced spot diameter on the disk. In such cases, arrangements are made to correct spherical aberration that is generated by the thickness error of the transmission substrate. For example, as disclosed in Japanese Laid-open Patent Publication No. 10(1998)-106012, the modulation level, jitter, and error rate of a signal reproduced from the disk are monitored, and a spherical aberration correction means (lens) is driven in response to the monitored results.

However, the spherical aberration cannot be corrected by the above method in the case of recording onto an unrecorded disk, since a reproduced signal cannot be obtained. Furthermore, the jitter, error rate, modulation level, etc., are also affected, for example, by a tilt, birefringence, etc., of the substrate, and when such factors exist, the jitter, error rate, modulation level, etc., increase, causing a servo system to operate erroneously.

SUMMARY OF THE INVENTION

It is, therefore, an object of the present invention to provide a pickup device which can correct spherical aberration issued by a thickness error of a transmission substrate regardless of whether a disk is recorded or unrecorded even if an optical system includes an objective lens having high numerical aperture.

According to the present invention, there is a pickup device for writing or reading information onto or from an optical disk having a recording surface that is covered with a transmission substrate. The pickup device comprises: light extraction means for illuminating a light beam onto the recording surface via an objective lens with a first predetermined numerical aperture and for obtaining light reflected from the recording surface via the objective lens; first focus error detection means for detecting first reflected light corresponding to first illuminated light which is illuminated via a portion with a numerical aperture that is less than or equal to a second predetermined numerical aperture which is smaller than the first predetermined numerical aperture, of the reflected light obtained from the light extraction means, and for generating a first error signal which indicates a focus error of the first illuminated light on the recording surface; second focus error detection means for detecting second reflected light corresponding to second illuminated light which is illuminated via a portion with a numerical aperture that is less than or equal to a predetermined numerical aperture which is greater than the second predetermined numerical aperture, of the reflected light obtained from the light extraction means, and for generating a second error signal which indicates a focus error of the second illuminated light on the recording surface; and means for obtaining a signal corresponding to spherical aberration by using at least one of the first or second error signal.

In the pickup device according to the invention, since a first reflected light, of the reflected light from the recording surface of the optical disk, which has been transmitted through a portion of the objective lens that is of no more than a second predetermined numerical aperture which is smaller than a first predetermined numerical aperture, is detected to generate a first error signal and a second reflected light, of the reflected light, which has been transmitted through a portion of the objective lens that is of no more than a predetermined numerical aperture, which is greater than the second predetermined numerical aperture, is detected to generate a second error signal, at least one of the first and second error signal can be used to obtain a signal that indicates the spherical aberration caused by the thickness error of the transmission substrate.

DETAILED DESCRIPTION OF THE PREFERRED EMBODIMENTS

Embodiments of the present invention will now be described in detail with reference to the drawings.

Figure 1:
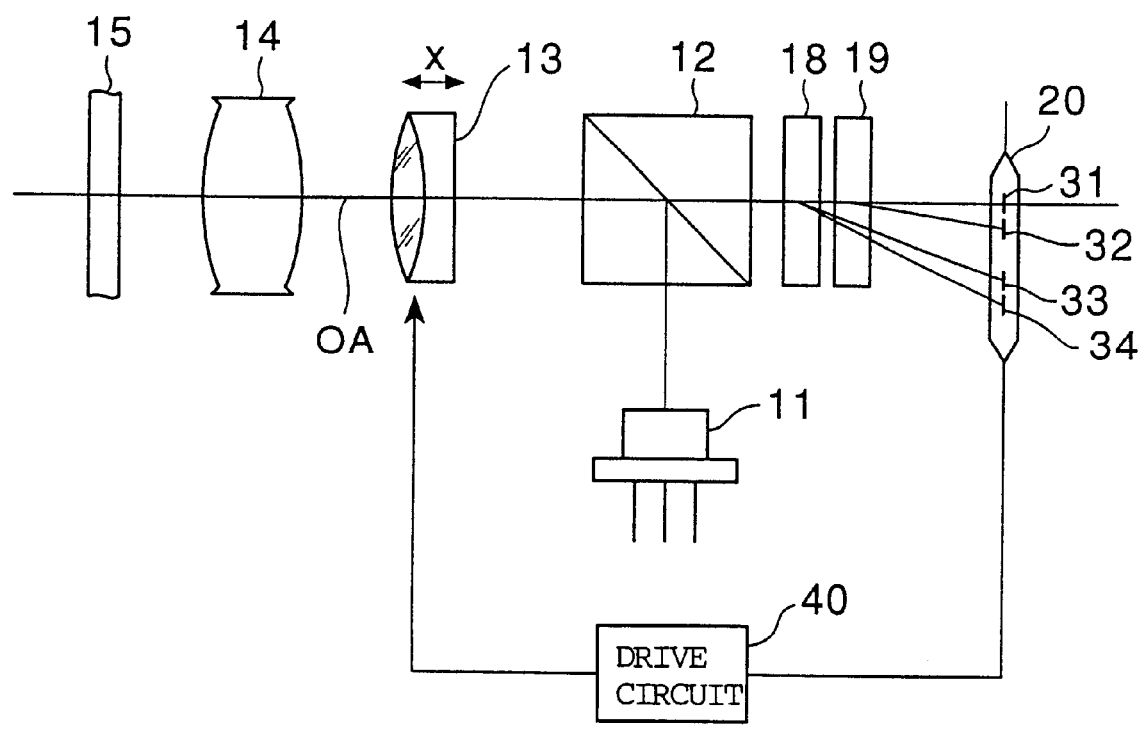
FIG. 1 is a diagram that shows an optical system of a pickup device according to the present invention.

FIG. 1 shows an optical system of a pickup device according to the present invention. In the pickup device, a light source 11 emits laser light upon being driven by an unillustrated drive circuit. The laser light emitted from the light source 11 is reflected by a beam splitter 12 in the direction of an optical axis OA at the side of an optical disk 15 and then reaches an objective lens 14 via a collimator lens 13 as a parallel laser beam. The objective lens 14 causes the laser beam to converge onto a recording surface of the optical disk 15. The light beam which has been reflected from the recording surface of the optical disk 15 is made into a parallel laser beam by the objective lens 14 and the collimator lens 13 and then reaches a hologram element 18 upon passing straight through the beam splitter 12. A hologram element 19 is disposed in continuation with the hologram element 18. The laser beam which has passed through these two hologram elements 18 and 19 reaches a photodetection unit 20. The objective lens 14, collimator lens 13, beam splitter 12, and hologram elements 18 and 19 are disposed so that the optical axis OA passes through their center.

Figure 2:
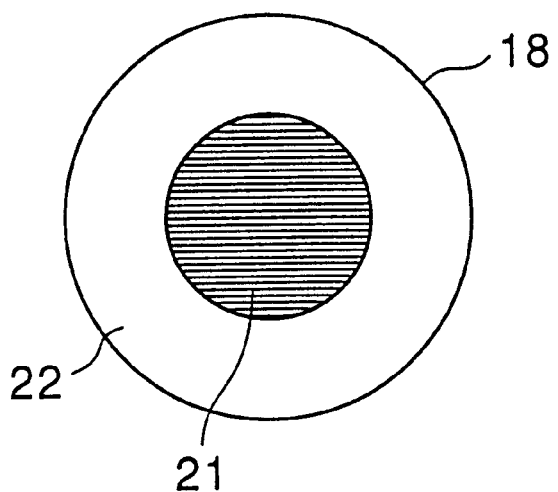
FIG. 2 is a diagram that shows the pattern of a hologram element 18 in the optical system of FIG. 1.

As shown in FIG. 2, when viewed from the direction of the optical axis OA, the hologram element 18 has a periphery with a circular shape and has a circular hologram pattern 21 formed at its center portion. The hologram pattern 21 is formed in a small size at the inner side of an outer portion 22 which corresponds to the effective optical path, and is also formed to diffract a light beam by a predetermined angle. The pattern has straight lines and further has a blaze-shaped surface to converge diffracted light energy in a specific direction. The portion of the hologram pattern 21 is formed so as to allow transmission of the reflected light of the light beam that has been illuminated onto the optical disk 15 upon transmission through a region of the objective lens 14 corresponding to a numerical aperture NA of 0.31 or less. The outer portion 22 is formed so as to allow transmission of the reflected light of a light beam that has been illuminated onto the optical disk 15 upon transmission through a region of the objective lens 14 corresponding to a numerical aperture NA of 0.85 or less.

Figure 3:
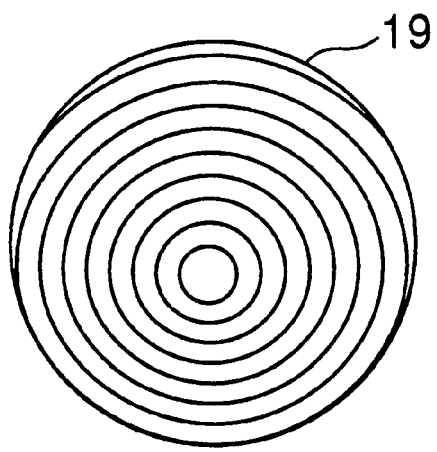
FIG. 3 is a diagram that shows the pattern of a hologram element 19 in the optical system of FIG. 1.

As shown in FIG. 3, when viewed from the direction of the optical axis OA, the hologram element 19 has a periphery with a circular shape and has a concentric circle pattern which acts as a concave lens. The center point of the concentric circle pattern is a point that is away from the center of the circular shape. Two light beams of which focal point positions are different from each other are emitted towards the photodetection unit 20 from the hologram element 19.

Figure 4:
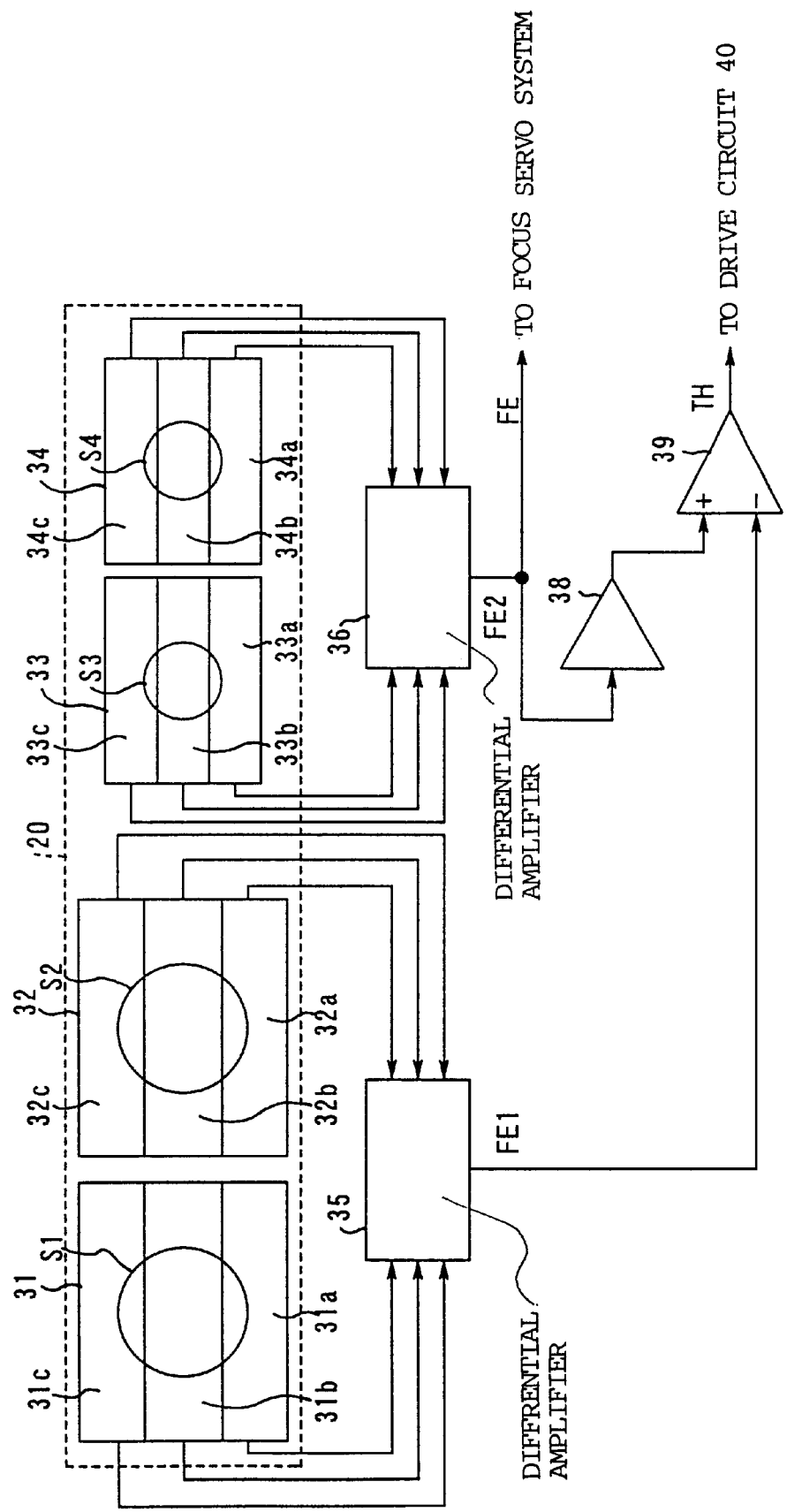
FIG. 4 is a block diagram that shows a circuit arrangement in the pickup device of FIG. 1.

The photodetection unit 20 is disposed at substantially the middle of the different focal point positions of the two laser beams separated by the hologram element 19 and is equipped with four photodetectors 31 through 34. The photodetectors 31 through 34 are positioned on a plane that is perpendicular to the optical axis OA. The photodetector 31 is positioned on the optical axis OA, and the photodetectors 32, 33, and 34 are disposed to lie in the same direction and to move further away from the optical axis OA, in that order. As shown in FIG. 4, the light receiving surface of each of the photodetectors 31 through 34 is divided into three portions by dividing lines that run in the direction in which the photodetectors are disposed, and output can be obtained from each of these three portions.

A differential amplifier 35 is connected to the three photodetection elements 31a through 31c into which the photodetector 31 is divided and the three photodetection elements 32a through 32c into which the photodetector 32 is divided. Also, a differential amplifier 36 is connected to the three photodetection elements 33a through 33c into which the photodetector 33 is divided and the three photodetection elements 34a through 34c into which the photodetector 34 is divided. The differential amplifier 35 generates a first error signal FE1 and the differential amplifier 36 generates a second error signal FE2. The second error signal FE2 is supplied as a focus error signal FE to a focus servo system (not shown) of the optical disk player.

Furthermore, the output of the differential amplifier 35 is connected to a differential amplifier 39. Also, the output of the differential amplifier 36 is connected via an amplifier 38 to the differential amplifier 39. The output signal of the differential amplifier 39 becomes a thickness error signal TH for a transmission substrate of the disk 15.

The thickness error signal TH is supplied to a drive circuit 40, and the drive circuit 40 drives the collimator lens 13 in the direction of the optical axis OA as shown by an arrow X in FIG. 1 in accordance with the thickness error signal TH.

In the pickup device with the above constitution, a light beam that has been reflected at the recording surface of the optical disk 15 reaches the hologram element 18 via the objective lens 14, collimator lens 13, and beam splitter 12. From the light made incident onto the hologram element 18, light that is not diffracted by the hologram pattern 21 but is transmitted as it is in the optical axis OA direction (zero-order diffracted light) and the first-order diffracted light, obtained by diffraction by the hologram pattern 21, are then obtained.

With regard to the light transmitted from the hologram element 18 to the hologram element 19, the hologram element 19 outputs light that is transmitted as it is and causes a spot S1 to be formed by the transmitted light on the light receiving surface of the photodetector 31 and also outputs first-order diffracted light and causes a spot S2 to be formed by the first-order diffracted light on the light receiving surface of the photodetector 32. With regard to the first-order diffracted light from the hologram element 18 to the hologram element 19, the hologram element 19 outputs light that is transmitted as it is and causes a spot S3 to be formed by the transmitted light on the light receiving surface of the photodetector 33 and also outputs first-order diffracted light and causes a spot S4 to be formed by the first-order diffracted light on the light receiving surface of the photodetector 34.

When the light that is illuminated onto the optical disk 15 is small in spherical aberration and is in the focused condition, the diameters of the spots formed on the photodetectors 31 and 32 are substantially equal in magnitude and the diameters of the spots formed on the photodetectors 33 and 34 are also substantially equal in magnitude.

Thus at the differential amplifier 35, a first error signal FE1 is generated in accordance with the respective output levels of the photodetection elements 31a through 31c of the photodetector 31 and the photodetection elements 32a through 32c of the photodetector 32. If 31aOUT through 31cOUT are the respective output levels of the photodetection elements 31a through 31c and 32aOUT through 32cOUT are the respective output levels of the photodetection elements 32a through 32c, the first error signal FE1 can be expressed by the following equation (1).

$$FE1=(31a\text{OUT}+31c\text{OUT}-31b\text{OUT})-(32a\text{OUT}+32c\text{OUT}-32b\text{OUT}) \quad (1)$$

At the differential amplifier 36, a second error signal FE2 is generated in accordance with the respective output levels of the photodetection elements 33a through 33c of the photodetector 33 and the photodetection elements 34a to 34c of the photodetector 34. If 33aOUT through 33cOUT are the respective output levels of the photodetection elements 33a through 33c and 34aOUT through 34cOUT are the respective output levels of the photodetection elements 34a through 34c, the second error signal FE2 can be expressed by the following equation (2).

$$FE2 = (33a\text{OUT} + 33c\text{OUT} - 33b\text{OUT}) - (34a\text{OUT} + 34c\text{OUT} - 34b\text{OUT}) \quad (2)$$

The first error signal FE1 is supplied as it is to the differential amplifier 39 and the second error signal FE2 is supplied to the differential amplifier 39 via the amplifier 38. If the amplification factor of the amplifier 38 is $\alpha$, the thickness error signal TH, which is the output signal of the differential amplifier 39 will be:

$$TH = \alpha \times FE2 - FE1 \quad (3)$$

Figure 5:
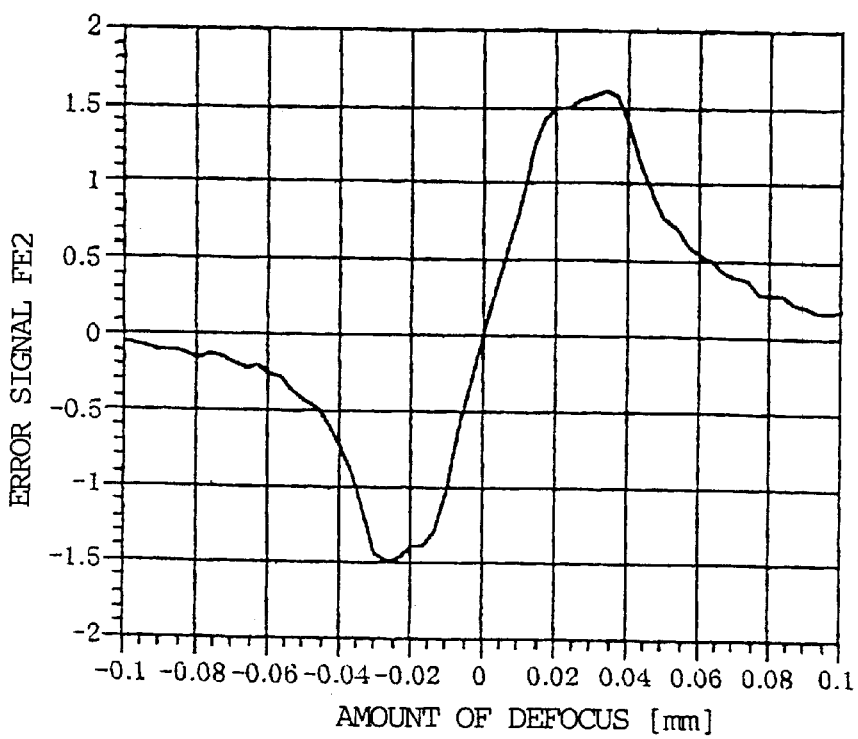
FIG. 5 is a diagram that shows a signal variation of a second error signal FE2.
Figure 6:
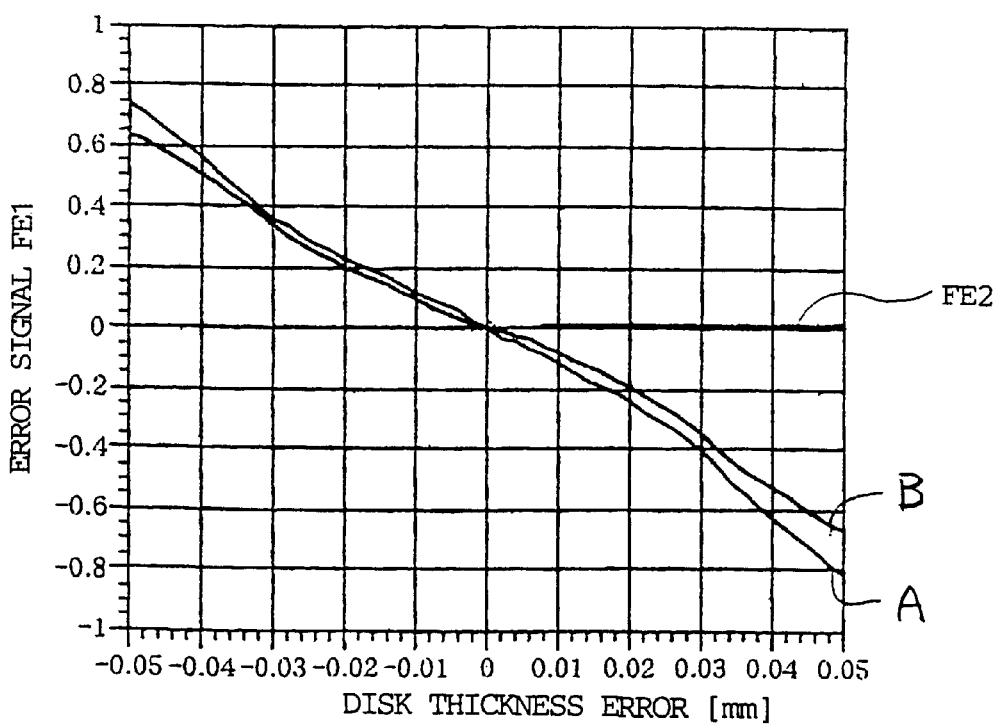
FIG. 6 is a diagram that shows a signal variation of a first error signal FE2.

FIG. 5 shows signal variation of the second error signal FE2 with the amount of defocus when the thickness of the transmission substrate of the optical disk 15 is of a standard value. FIG. 6 shows signal variation of the first error signal FE1 in the case where the focus servo system is operated in accordance with the second error signal FE2, that is, the variation with the thickness error of the transmission substrate of the optical disk 15 in the just-focused condition. In this case, though the second error signal FE2 is controlled to be substantially equal to zero, the first error signal FE1 varies in accordance with the thickness error of the transmission substrate. Since the thickness error signal TH, which is calculated from the above equation (3), is substantially proportional to the first error signal FE1 when the second error signal FE2 is controlled to be substantially equal to zero, the first error signal FE1 indicates the thickness error of the transmission substrate of the optical disk 15. In FIG. 6, a characteristic A is the signal variation of the first error signal FE1 based on the output of the photodetector 31 resulting from the outer portion 22 when practically all of the light is diffracted by the hologram pattern 21 of the hologram element 18, and a characteristic B is the signal variation of the first error signal FE1 based on the output of the photodetector 31 that has received light from both of the hologram pattern 21 and the outer portion 22.

The calculated thickness error signal TH causes the collimator lens 13, via the drive circuit 40, to move in parallel in the direction of the optical axis OA.

Although the spherical aberration is corrected by driving the collimator lens 13 in accordance with the thickness error signal TH in the above-described embodiment, it is possible to use arrangements for operation such as adjustment of equalizer characteristics, control of the laser power or strategy during recording, etc. As examples of the arrangements, various designs can be made according to required medium illumination power, recording sensitivity, thickness of the transmission substrate used, control range, etc.

Figure 7:
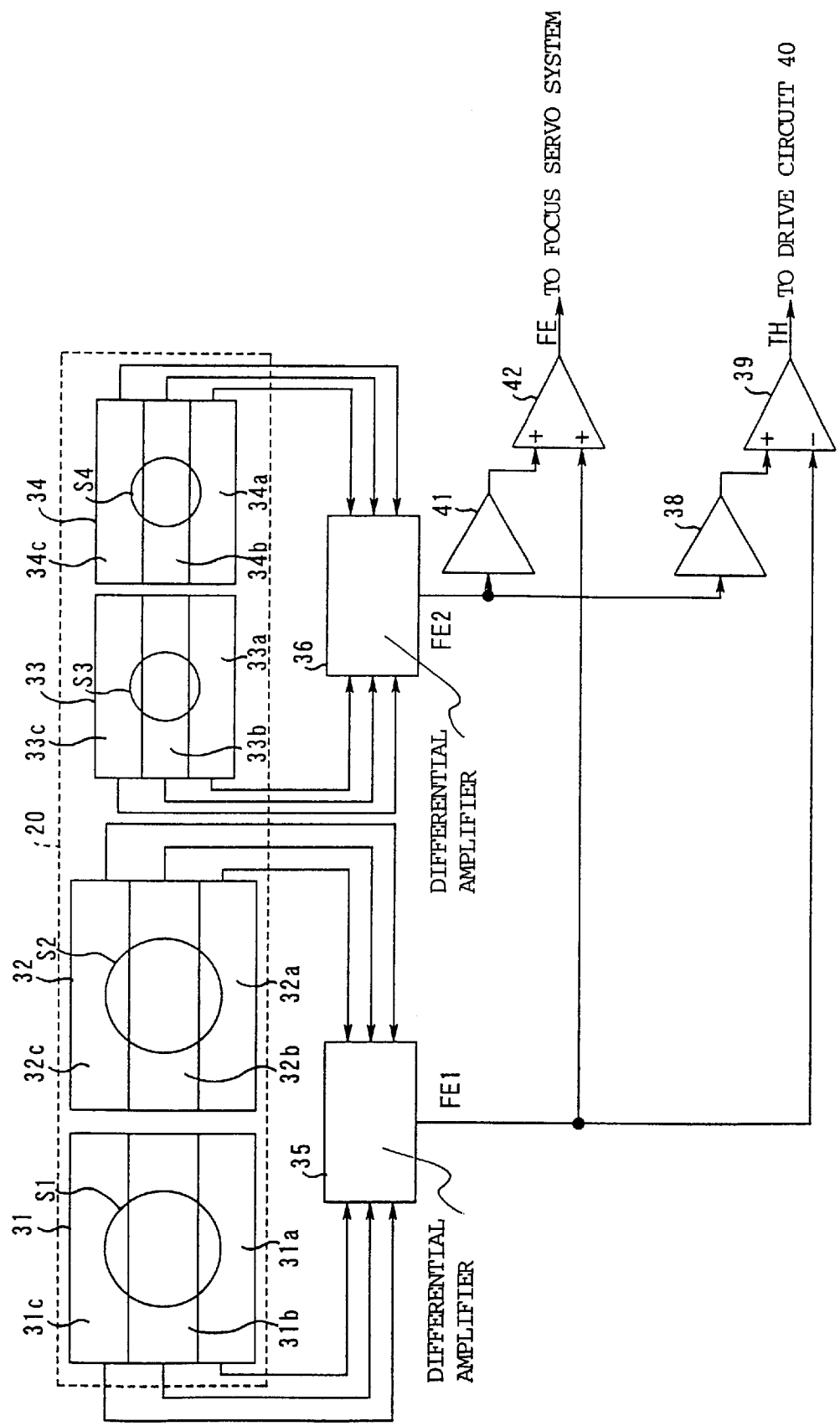
FIG. 7 is a block diagram that shows a circuit arrangement of another embodiment of the invention.

Also, although in the above-described embodiment, only the second error signal FE2, which is based on the received amount of reflected light that was diffracted by the pattern 21 having a small numerical aperture, is supplied to the focus servo system for focus control, just the first error signal FE1, which is based on the received amount of reflected light that had passed through the outer portion 22 having a large numerical aperture, may be supplied instead of the second error signal FE2 to the focus servo system for the focus control. Further, both of the first and second error signals FE1 and FE2 may be used for the focus control. An arrangement for the case is illustrated in FIG. 7. An adder 42 and an amplifier 41 with an amplification factor $\beta$ are provided anew, and the first error signal FE1 is supplied to one of the input terminals of the adder 42 while the second error signal FE2 is supplied to the other input terminal of the adder 42 via the amplifier 41. If the output signal of the adder 42 is FE, the signal FE will given by:

$$FE = \beta \times FE2 + FE1 \quad (4)$$

The signal FE is supplied to the focus servo system for the focus control. The amplification factor $\beta$ is set so as to decrease the effect of spherical aberration contained in the second error signal FE2.

Furthermore, although a method by which spot diameters are measured by photodetectors that are divided into three parts is used as the method for generation of the respective error signals in the above-described embodiment, it is not necessary to be limited to this method, for example, the hologram element 19 may be provided with a shape that gives rise to astigmatism and the error signals may be generated by providing astigmatism to the light that passes through. The error signals FE1 and FE2 may also be generated using a conventional method by which the diameter of each spot generated by the different numerical apertures is detected by a photodetector that is divided into three portions without using the hologram element 19.

Also, although the above-described embodiment is an arrangement in which the light beam of the reflected light from the disk 15 is divided into two regions in the process of passage through the hologram element 18, arrangements are also possible wherein a means corresponding to the hologram element 18 is provided at one of the surfaces of the objective lens or is provided to be driven together with the objective lens. In the case where the hologram 18 or other means that divides the light beam into two regions is disposed in the optical path through which the light illuminated onto the disk and the resulting reflected light pass, a polarizing hologram, which exhibits an effect on a polarization component of a specific direction, may be used along with a wave plate to restrict the loss amount of light that occurs in the optical path of the illuminated light.

Furthermore, although the tracking of the disk was not explained for the above-described embodiment, a known arrangement, such as an arrangement wherein a push-pull tracking error signal is obtained, for example, by dividing a hologram element into two parts in the radial direction and arranging each part to converge light onto individual positions, an arrangement wherein a hologram element is provided with a four-part shape to obtain a tracking error signal by the phase difference method, etc., may be used.

Also, although the hologram elements 18 and 19 were disposed individually in the above-described embodiment, the patterns may be integrated to provide a single hologram.

Figure 8:
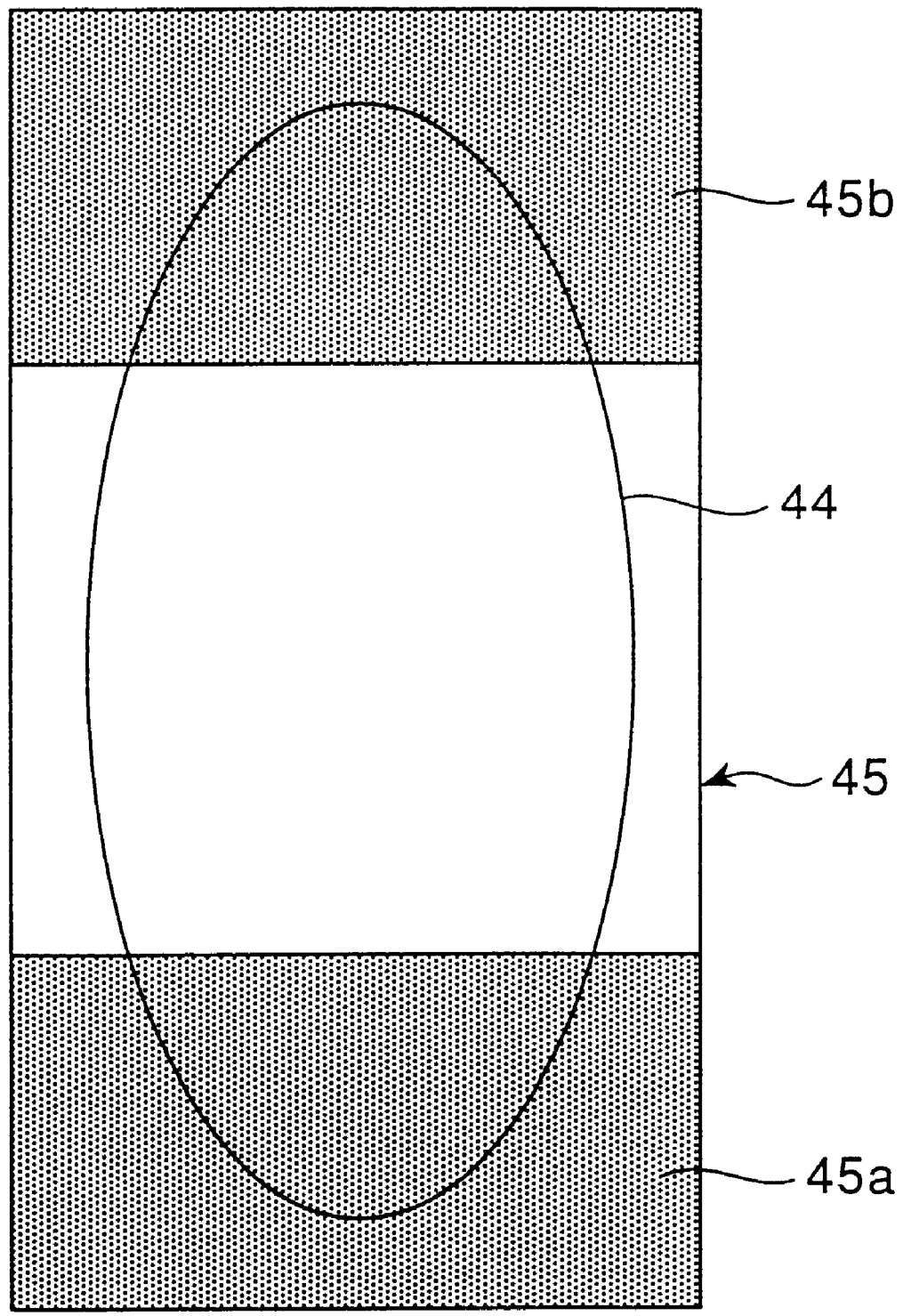
FIG. 8 is diagram that shows the pattern of a hologram element of yet another embodiment of the invention.

Furthermore, though the above-described embodiment is arranged on the premise that the aperture of the pupil of the objective lens 14 is circular, the aperture is not limited to being circular and may be an elongated aperture of elliptical shape, etc. Such an elliptical pupil may be applied to an optical system having different numerical apertures, and it is particularly effective to make divisions in the direction in which the numerical apertures differ. For example, if an elliptical aperture is used, the patterns of a hologram element 45, to be provided in place of the hologram 18, may be formed just at outer portions 45a and 45b of the hologram 45 that has been divided into three portions in the direction of the major axis of an elliptical pupil 44 as shown in FIG. 8, and by doing so, the effect of a deviation in the transverse direction of the hologram element can be reduced. In the case, the direction of the minor axis of the ellipse corresponds to being in the direction of pit trains on the disk, in other words, the time axis direction.

Figure 9:
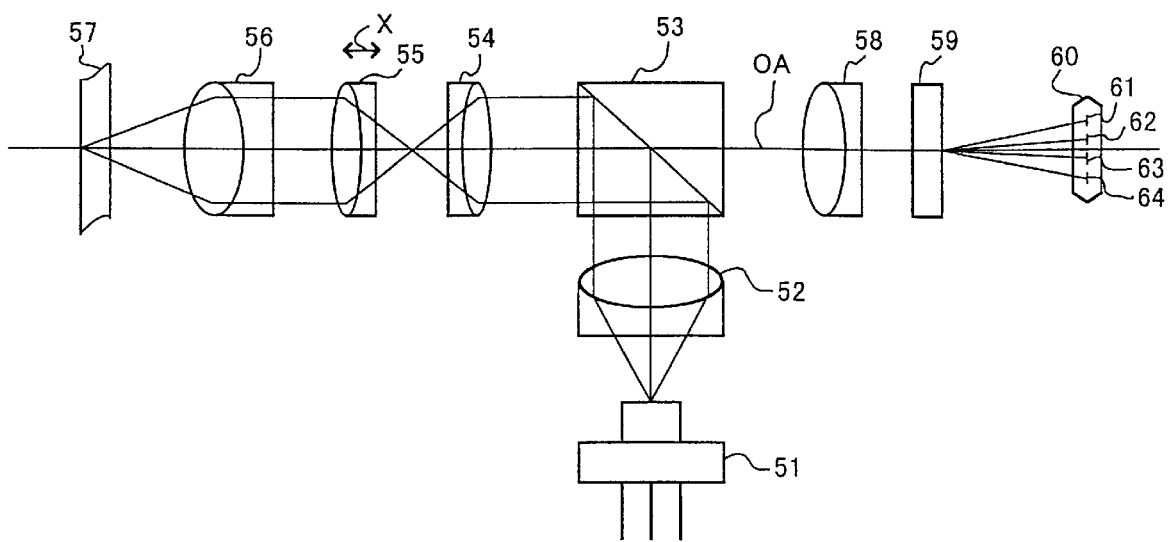
FIG. 9 is a diagram that shows the optical system of a pickup device of yet another embodiment of the invention.

FIG. 9 shows an optical system in a pickup device, which is another embodiment of the present invention. In the pickup device, a light source 51 emits laser light upon being driven by an unillustrated drive circuit, and after being changed into a parallel laser beam by a collimator lens 52, the laser light emitted from the light source 51 is reflected by a beam splitter 53 in the direction of an optical axis OA at the side of an optical disk 57 and then reaches an objective lens 56 via compensating lenses 54 and 55 as a parallel laser beam. The objective lens 56 causes the laser beam to converge onto a recording surface of the optical disk 57. The light beam that is reflected from the recording surface of the optical disk 57 reaches the beam splitter 53 via the objective lens 56 and the compensating lenses 55 and 54. The reflected light that has passed straight through the beam splitter 53 is converged by a condenser lens 58 and reaches a hologram element 59. The laser beam that has passed through the hologram element 59 then reaches a photodetection unit 60.

Figure 10:
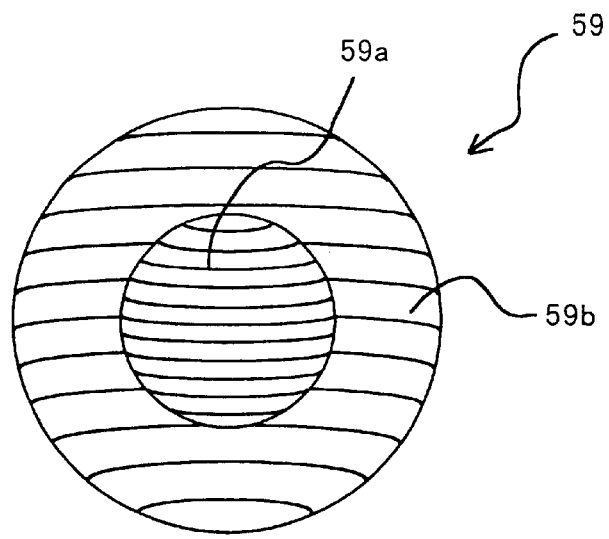
FIG. 10 is a diagram that shows the pattern of a hologram element 59 in the optical system of FIG. 9.

As shown in FIG. 10, when viewed from the direction of the optical axis OA, the hologram element 59 has a periphery with a circular shape, acts as a convex lens for positive primary light and converges the light in front of the photodetection unit 60, and acts as a concave lens for negative primary light and converges the light at the inside of the photodetection unit 60. A circular pattern 59a at the inner portion of the hologram element 59 and a ring pattern 59b at the outer portion of the hologram element 59 are formed with stripes, and as shown in FIG. 10, the interval between stripes of the circular pattern 59a differs from that of the ring pattern 59b, so that the refractive angles of light beams at the respective inner portion and the outer portion differ from each other.

Figure 12:
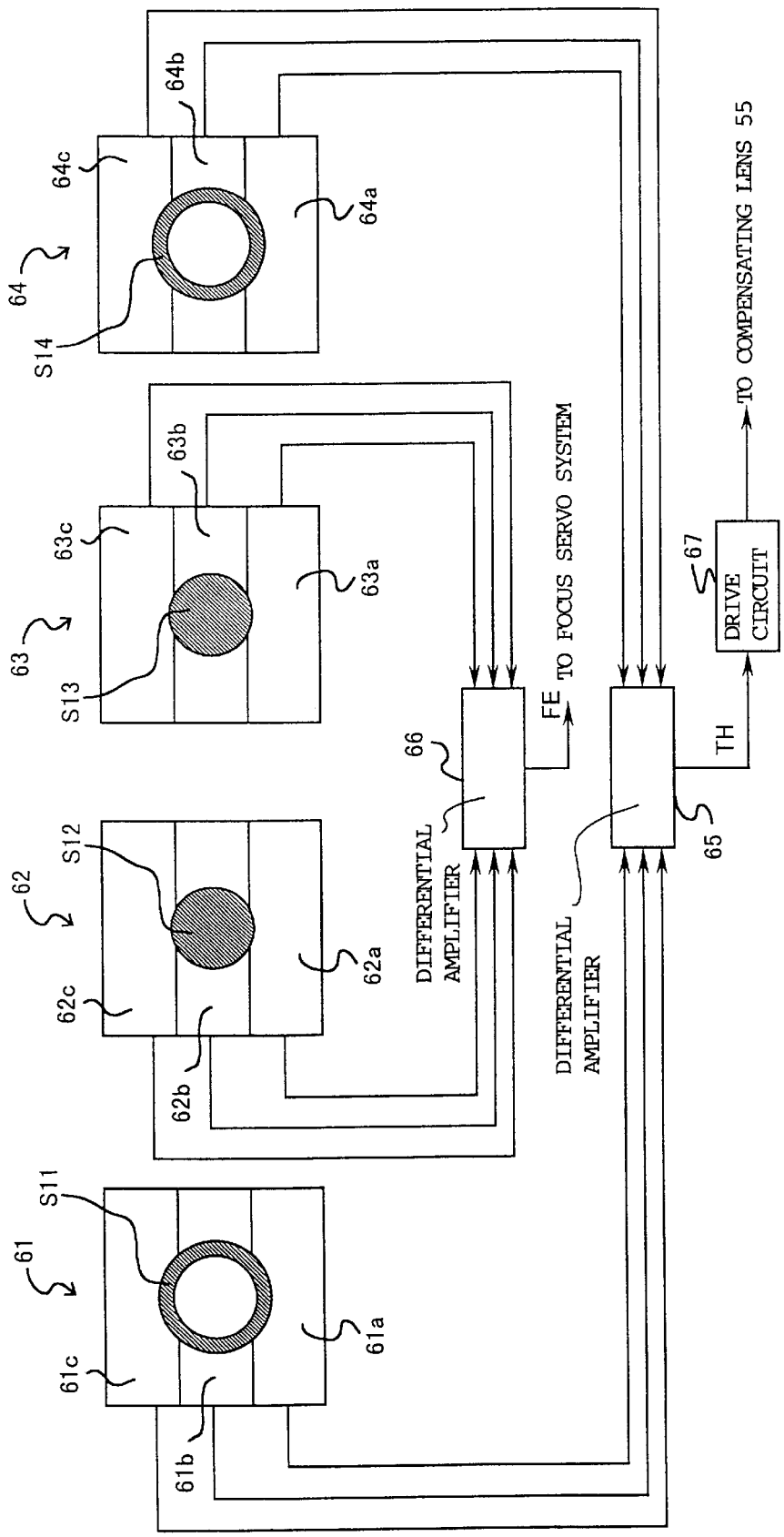
FIG. 12 is a block diagram that shows a circuit arrangement in the pickup device of FIG. 9.

The photodetection unit 60 is equipped with four photodetectors 61 through 64 which are disposed in that number order on a plane perpendicular to the optical axis OA. The optical axis OA is positioned between the photodetectors 62 and 63. Also as shown in FIG. 12, the light receiving surface of each of the photodetectors 61 through 64 is divided into three portions by division lines in the arrangement direction of the photodetectors 61 through 64. Each of these three portions generates an output.

Figure 11:
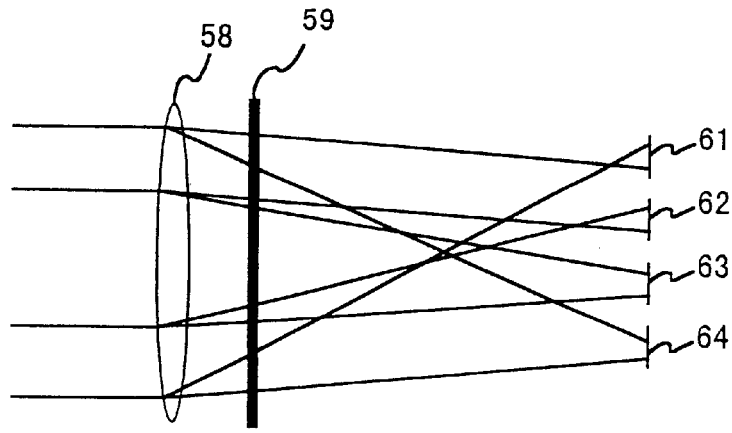
FIG. 11 is a diagram that shows convergence of reflected light on optical detectors 61 through 64 of FIG. 9.

FIG. 11 shows convergence of reflected light onto each of the photodetectors 61 through 64.

As can be understood from FIG. 11 and, furthermore, from FIG. 12, a ring spot S11, due to positive primary light that has passed through the ring pattern 59b of the hologram element 59, is formed on the photodetector 61, a circular spot S12, due to positive primary light that has passed through the circular pattern 59a of the hologram element 59, is formed on the photodetector 62, a circular spot S13, due to negative primary light that has passed through the circular pattern 59a of the hologram element 59, is formed on the photodetector 63, and a ring spot S14, due to negative primary light that has passed through the ring pattern 59b of the hologram element 59, is formed on the photodetector 64.

Also as shown in FIG. 12, a differential amplifier 65 is connected to three photodetection elements 61a through 61c into which the photodetector 61 is divided and three photodetection elements 64a through 64c into which the photodetector 64 is divided. Also, a differential amplifier 66 is connected to three photodetection elements 62a through 62c into which the photodetector 62 is divided and three photodetection elements 63a through 63c into which the photodetector 63 is divided. The differential amplifier 65 generates a first error signal FE1, and the first error signal FE1 becomes a thickness error signal TH for the transmission substrate of the disk 57. The thickness error signal TH is supplied to a drive circuit 67 which drives the compensating lens 55 in accordance with the thickness error signal TH in the direction of the optical axis OA, as shown by arrow X in FIG. 9. A differential amplifier 66 generates a second error signal FE2 which is supplied as a focus error signal FE to a focus servo system (not shown) in the optical disk player.

In the above embodiment, the first error signal FE1 is used as the thickness error signal TH without subtracting the level of the second error signal FE2 from that of the first error signal FE1. This is done for the reason that, since the second error signal FE2 is used for the focus control, the level of the second error signal FE2 always becomes zero during the focus control. That is, the first error signal FE1 is used as the thickness error signal TH without subtraction of the second error signal FE2, the signal level of which is zero.

As described above, in the pickup device according to the present invention, since, of the reflected light from the recording surface of an optical disk, a first reflected light, that has passed through an objective lens portion with a numerical aperture that is less than or equal to a second predetermined numerical aperture that is smaller than a first predetermined numerical aperture, is detected to generate a first error signal, and since, of the reflected light from the recording surface, a second reflected light, that has passed through an objective lens portion with a numerical aperture that is less than or equal to a predetermined aperture that is greater than the second predetermined numerical aperture, is detected to generate a second error signal, a signal that indicates the spherical aberration that occurs due to the thickness error of the transmission substrate can be obtained by using at least one of either the first or second error signal. The spherical aberration that occurs due to the thickness error of the transmission substrate can thus be corrected regardless of whether the disk is recorded or unrecorded and even if the optical system uses an objective lens of high numerical aperture.

What is claimed is:

1. A pickup device for writing or reading information onto or from an optical disk having a recording surface that is covered with a transmission substrate, comprising:

light extraction means for illuminating a light beam onto said recording surface via an objective lens with a first predetermined numerical aperture and for obtaining light reflected from said recording surface via said objective lens;

first focus error detection means for detecting first reflected light corresponding to first illuminated light which is illuminated via a portion with a numerical aperture that is less than or equal to a second predetermined numerical aperture which is smaller than said first predetermined numerical aperture, of the reflected light obtained from said light extraction means, and for generating a first error signal which indicates a focus error of said first illuminated light on said recording surface;

second focus error detection means for detecting second reflected light corresponding to second illuminated light which is illuminated via a portion with a numerical aperture that is less than or equal to a predetermined numerical aperture which is greater than said second predetermined numerical aperture, of the reflected light obtained from said light extraction means, and for generating a second error signal which indicates a focus error of said second illuminated light on said recording surface; and means for obtaining a signal corresponding to spherical aberration by using at least one of said first or second error signal.

2. A pickup device according to claim 1, further comprising means for comparing said first and second error signals and for obtaining a signal corresponding to the spherical aberration in accordance with the compared result.

3. A pickup device according to claim 1, further comprising focus control means for driving said objective lens by using at least a remained error signal other than said at least one of said first and second error signal.

* * * * *